United States Patent [19]

Gerhardt

[11] 3,999,650

[45] Dec. 28, 1976

[54] APPARATUS FOR SPREADING COMMINUTED MATERIAL ON A TRANSPORT BAND

[75] Inventor: Klaus Gerhardt, Rheurdt, Germany

[73] Assignee: G. Siempelkamp & Co., Krefeld, Germany

[22] Filed: June 9, 1975

[21] Appl. No.: 584,818

[30] Foreign Application Priority Data

June 8, 1974 Germany .......................... 2427707

[52] U.S. Cl. ................................ 198/552; 198/601; 222/254; 264/109

[51] Int. Cl.$^2$ .......................................... B65G 37/00

[58] Field of Search ................ 425/83, 84, 92, 101, 425/201, 209, 223, 224, 363, 81; 118/208; 209/115, 120, 12, 45, 46, 20; 198/81; 222/254; 264/109, 112, 122; 156/62.2;497;555;582

[56] References Cited

UNITED STATES PATENTS

| | | | |
|---|---|---|---|
| 3,864,066 | 2/1975 | Gerhardt | 425/84 |
| 3,873,662 | 3/1975 | Gartlidge et al. | 156/62.2 |

FOREIGN PATENTS OR APPLICATIONS

| | | | |
|---|---|---|---|
| 511,335 | 3/1952 | Belgium | 222/254 |

*Primary Examiner*—Francis S. Husar
*Assistant Examiner*—R. J. Charvat
*Attorney, Agent, or Firm*—Karl F. Ross; Herbert Dubno

[57] ABSTRACT

A plurality of chutes are spaced downstream of a supply of comminuted material. A first transport band displaces the material upwardly out of the supply and drops the material into the first chute. Some of the material dropped into the first chute is spread by a distributing brush at the bottom of the chute onto the transport band and the balance of the material is picked up by a second transport band extending upwardly out of the first chute and terminating above a second chute so as to drop this material into the second chute whence it is deposited by another distribution brush onto the belt on top of the material deposited from the first chute. Both of the transport bands are inclined at the same angle to the horizontal and are independently driven at different speeds.

7 Claims, 1 Drawing Figure

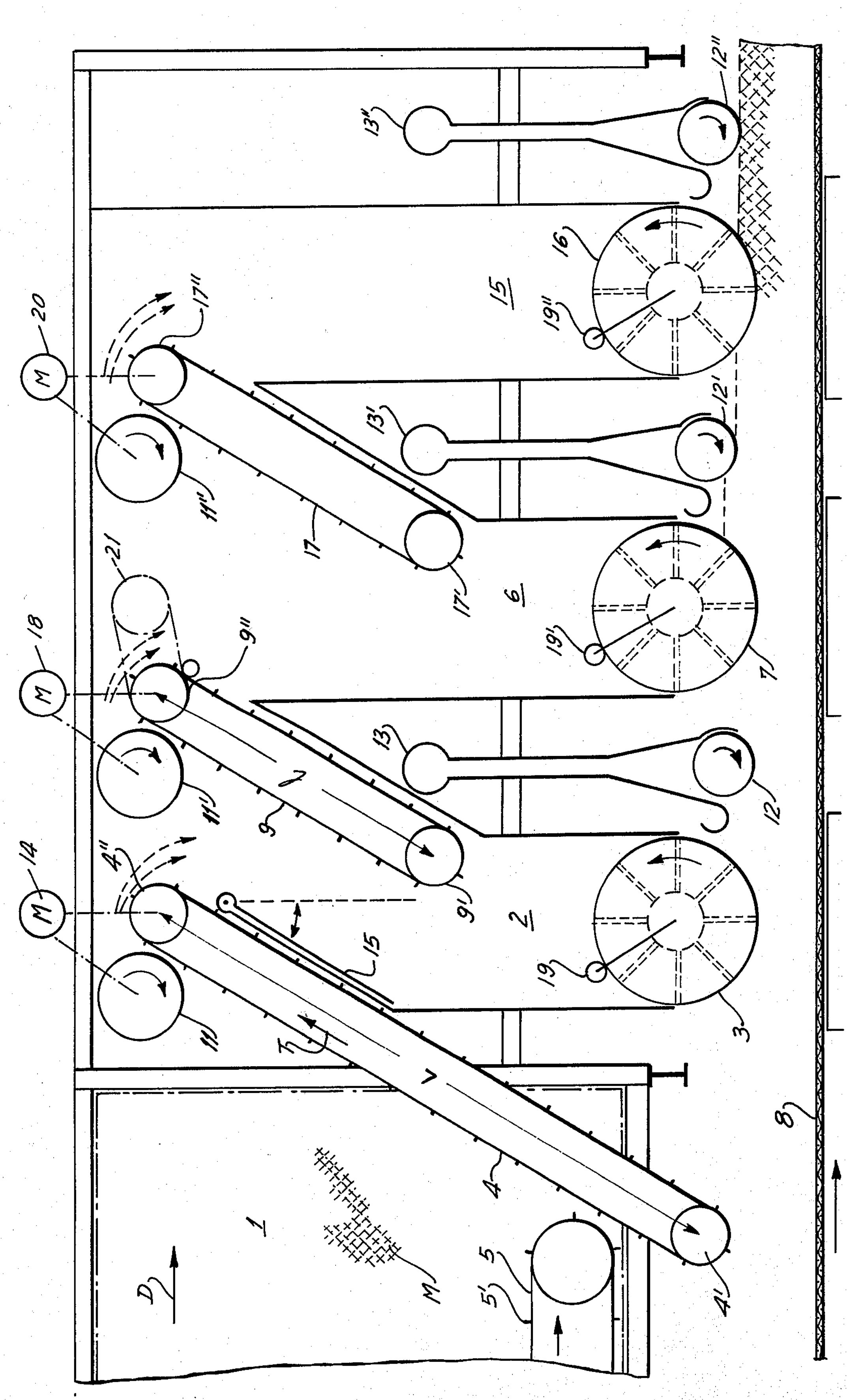
M
14
M
18
M
20
21
1
2
3
4
15
17

APPARATUS FOR SPREADING COMMINUTED MATERIAL ON A TRANSPORT BAND

CROSS-REFERENCE TO RELATED APPLICATIONS

This application is related to patent applications Ser. Nos. 369,734 and 556,966 filed 13 June 1973 and 10 Mar. 1975 respectively, U.S. Pat. Nos. 3,864,066 and 3,960,276, respectively.

FIELD OF THE INVENTION

The present invention relates to an apparatus for distributing comminuted material on a substrate. More particularly this invention concerns the even distribution of fibers, chips, and the like on a moving support in the production of fiberboard, chipboard, and the like.

BACKGROUND OF THE INVENTION

It is frequently necessary to form an even layer of comminuted material such as fibers, chips, and the like on a substrate in the production of plate-like building material. See for instance my U.S. Pat. No. 3,864,066 issued 4 Feb. 1975. It is necessary that such an arrangement form on the substrate a layer of uniform thickness and homogeneity. In order to maximize production speeds it is also necessary that the substrate move as fast as possible. To this end the spreading arrangement must be able to handle a relatively large amount of material, while at the same time there should be no decrease in uniformity of the layer put down on the substrate.

In a known system a bin, hopper, or the like loaded with a supply of comminuted material is provided adjacent the substrate. Extending upwardly out of this supply is a first conveyor band which displaces the material upwardly downstream and drops this material into the top of a conveyor chute. A distributing arrangement, such as a brush, is provided at the bottom of the chute for spreading the material dropped thereinto on the substrate. Such a device has the considerable disadvantage that the amount of material it can evenly spread is severely limited. The displacement rate of the lifting belt as well as the rotation rate of the spreading brush can only be increased to a certain point beyond which the results are so uneven as to be unusable.

OBJECTS OF THE INVENTION

It is therefore an object of the present invention to provide an improved apparatus of the above-described general type.

Another object of this invention is the provision of an improved apparatus for distributing comminuted material on a substrate which is moving at extremely high speed.

SUMMARY OF THE INVENTION

These objects are attained according to the present invention in an apparatus wherein a second distribution chute is provided immediately downstream of the first chute. A second transport band is inclined upwardly in the transport direction of the substrate and has a lower upstream end upstream of and below the downstream end of the first band and an upstream band above the second chute. Means is provided for driving the second transport band to catch some of the material dropped into the first chute by the first band and to transport the caught material up and drop same into the second chute. Further distribution means is provided at the bottom of the second chute for spreading the material dropped thereinto onto the substrate.

According to another feature of this invention the second transport band is approximately half as long as the first transport band and is arrayed at approximately the same angle at the horizontal as this first transport band. The drive means for the transport bands operate independently to allow the system to adapt to different kinds of material and different spreading thicknesses, preferably being set up so that each spreading means at the bottom of each chute distributes approximately the same amount of material per unit time.

With a system according to the present invention a certain portion of the comminuted material is transported from the supply by the first band directly to the second band. Thus it is possible to operate the first band at approximately twice its normal speed so as to remove from the supply approximately twice the normal amount of material per unit time. At the same time both of the distributors at the bottom of the chutes can operate at their normal ideal speed for maximum uniformity of spreading and layering, and for maximum efficiency. An extremely homogeneous layer can thus be produced at very high speed so that overall production speed of fiberboard, chipboard, or the like is greatly increased. In use such a system has been found to offer many advantages not to be expected from a simple duplication of the primary chute. In fact an extremely homogeneous and even layer can be produced, even not taking into account the increased production capacity.

According to further features of the present invention a counterrotating stripper roller is provided at each of the transport bands to even the amount of material being carried thereby. In addition an aspiration device and further evening roller is provided immediately downstream of each of the distributing means so as to insure that the coating applied by the arrangement is of uniform thickness.

It also lies within the scope of this invention to provide a third such chute, having a third transport band and a third distributing arrangement. This type of arrangement can be used for chipboards of considerable thickness or for production at very high speeds. In each case the peripheral velocity of each of the transport bands is considerably less than that of the band immediately upstream. The rotation rate of the spreading brushes at the bottom of each of the chutes may be equal.

BRIEF DESCRIPTION OF THE DRAWING

The above and other objects, features, and advantages will become more readily apparent from the drawing whose sole FIGURE shows in longitudinal section, and partly schematic form, an apparatus according to the present invention.

SPECIFIC DESCRIPTION

As is shown in the FIGURE an apparatus according to the present invention has a bin or hopper 1 containing a mass of comminuted material indicated generally at *m*. Provided in the bottom of this hopper 1 is a horizontally extending transport belt 5 of the scraper type, that is having small upstanding scrapers 5′ for advancing the material *m* in a transport direction D. A first transport belt 4 has an upstream end 4′ below the downstream end of the belt 5 and an upstream end 4″ above a vertically extending shaft or chute 2 provided at its base with a rotatable distributing brush 3. A motor 14 serves to drive the belt 4 in the direction indicated by arrow T, that is upwardly out of the supply 1. This motor 14 is also connected to a smoothing roller 11 which rotates such that its peripheral rotation direction is opposite to that of the arrow T. The belt 4 is inclined at an angle of between 50° and 70° to the horizontal, here 60°.

The top of the chute 2 is provided with a flap 15 that can practically close off the chute 2 and prevent comminuted material from falling thereinto. In addition another transport belt 9 having an effective length *l* equal to approximately half of the effective length L of the belt 4 is provided with its upstream end 9' below and slightly upstream of the downstream end 4'' of the belt 4 and an upstream end 9'' arranged above a second chute 6. Another scrape-off roller 19' is provided at this transport belt 9 and a motor 18 drives this belt 9 and the roller 11'.

Some of the comminuted material dropped from the downstream end 4'' of the belt 4 is caught on the scraper belt 9 and transported upwardly under the roller 11' to the chute 6 where it is dropped down onto a distribution brush 7 identical to the brush 3. The belt 4 is driven at twice the rate of the belt 9 so that this belt 9 picks up approximately half of the material carried up the belt 4 and deposits it in the chute 6. In this manner the coating deposited on a rapidly moving transport belt 8 forming a substrate underneath the distributors 3 and 7 is built up in two stages, half by the distributor 3 and half by the distributor 7.

An evening roller 12 is provided between the brushes 3 and 7 can be connected to a suction device 13 so as to insure extremely even and regular distribution of the comminuted material on the belt 8 by rotating in contact with the deposited material so as to redistribute it where necessary and permit the even layer to pass therebelow. Any excess accumulating ahead of this roller is carried away by the suction device. The speeds of the motors 14 and 18 are adjusted for maximum efficiency, whereas the respective motors 19 and 19' driving these brushes 3 and 7 respectively preferably operate at the same rate.

In accordance with the present invention it is also possible to provide a third belt 17 similar to the belt 9 and extending between the chute 6 and a third chute 15 and having a respective drive motor 19''. Another vacuum device 13' and evening roller 12' are provided between the chutes 5 and 6, and yet another vacuum device 13'' and roller 12'' are provided slightly downstream of the chute 15 supported in the lateral walls (not shown) of the device on which the rollers supported. An evening roller 11'' is provided at the belt 17 and a motor 20 drives this belt 17 and the roller 11''. When three such belts are used the belt 4 is driven at three times the speed of the belt 17 and the belt 9 is driven at twice the rate of the belt 17. All of the belts 4, 9, and 17 are inclined at the same angle. In addition the belt 9 may have an extension as indicated at dot-dash lines 21 so that its downstream end overlaps the upstream end of the belt 17.

I claim:

1. An apparatus for distributing comminuted material on a substrate, said apparatus comprising:

means containing a supply of said comminuted material and disposed above said substrate, a first distribution chute immediately downstream of said supply in a transport direction and above said substrate, a first transport band inclined upwardly in said direction and having a lower upstream end in said supply and an upper downstream end above said first chute, means operatively connected to said first band for driving same and transporting said material upwardly from said supply and dropping said material down into said first chute, means at the bottom of said first chute for spreading material dropped thereinto onto said substrate, a second distribution chute immediately downstream of said first chute in said direction and above said substrate, a second transport band inclined upwardly in said direction and having a lower upstream end upstream of and below said downstream end of said first band and an upstream end above said second chute, means operatively connected with said second transport band for driving same to catch some of said material dropped into said first chute by said first band and to transport the caught material up and drop same into the second chute, and means at the bottom of said second chute for spreading material dropped into said second chute onto said substrate.

2. The apparatus defined in claim 1 wherein said bands are scraper belts provided with transverse scrapers for lifting said material.

3. The apparatus defined in claim 2 wherein said second band is generally half as long as said first band.

4. The apparatus defined in claim 2 wherein said first band and said second band are inclined at approximately the same angle to the horizontal.

5. The apparatus defined in claim 4, further comprising an evening roller spaced from said substrate between said chutes, and vacuum evening means at said evening roller for smoothing the layer of material deposited on said substrate from said first distribution chute.

6. The apparatus defined in claim 5 wherein said substrate is a belt moving in said transport direction.

7. The apparatus defined in claim 1, further comprising a third distribution chute immediately downstream from said second distribution chute above said substrate, a third transport band inclined upwardly in said direction and having a lower upstream end in said second chute and an upstream end above said third chute, means operatively connected to said third transport band for driving same to catch some of said material dropped into said second chute by said second band and to transport the caught material up and drop same into the third chute, and means at the bottom of said third chute for spreading material dropped into said third chute onto said substrate.

* * * * *